United States Patent [19]
Edwards et al.

[11] 3,946,783
[45] Mar. 30, 1976

[54] PNEUMATIC TIRES

[75] Inventors: Reginald Harold Edwards; Geoffrey Lionel Coulter, both of Sutton Coldfield; Alan Michael Dodd, Walsall; Michael John Kenney, Sutton Coldfield; Alan John Bourne, Sutton Coldfield; David Alexander Bird, Sutton Coldfield, all of England

[73] Assignee: Dunlop Limited, London, England

[22] Filed: Dec. 23, 1974

[21] Appl. No.: 536,945

Related U.S. Application Data

[63] Continuation of Ser. No. 353,938, April 24, 1973, abandoned.

[30] Foreign Application Priority Data

Sept. 2, 1972  United Kingdom............... 40823/72

[52] U.S. Cl......... 152/330 L; 152/158; 152/330 RF
[51] Int. Cl.²................... B60C 17/00; B60C 17/04
[58] Field of Search...... 152/330 R, 330 RF, 330 L, 152/158, 340

[56] References Cited
UNITED STATES PATENTS

| | | | |
|---|---|---|---|
| 3,142,326 | 7/1964 | Lindley | 152/158 |
| 3,143,155 | 8/1964 | Knox | 152/330 R |
| 3,254,692 | 6/1966 | Travers | 152/340 |
| 3,610,308 | 10/1971 | McDonald | 152/330 R |
| 3,739,829 | 6/1973 | Powell et al. | 152/330 R |

Primary Examiner—Drayton E. Hoffman
Attorney, Agent, or Firm—Stevens, Davis, Miller & Mosher

[57] ABSTRACT

A tire and wheel assembly having a lubricant to enable it to be operated in a deflated condition without destructive heating in which one or more ingredients of the lubricant composition are enclosed in an enclosing means, the other ingredient or ingredients of the composition being placed in the inflation chamber of the assembly. The enclosing means release the first ingredient or ingredients into the inflation chamber, upon loss of inflation pressure, to form the composition.

15 Claims, 7 Drawing Figures

PNEUMATIC TIRES

This is a continuation of Ser. No. 353,938, filed Apr. 24, 1973, now abandoned.

This invention relates to tires and also to assemblies of such tires with wheels.

The assignee's co-pending U.S. application Ser. No. 150,627 filed June 7, 1971 disclosed a pneumatic tire and wheel assembly comprising an enclosing means for lubricating material for the interior surface of the tire, said lubricating material being releasable from the enclosing means into the inflation chamber defined by the tire and wheel upon substantial loss of inflation pressure or deflation of the tire.

The lubricating material may comprise a composition which contains several ingredients for various purposes and in some cases it may be better for storage purposes if all the ingredients are not brought together until they are to be used.

According to the present invention a method for the manufacture of a tire and wheel assembly includes the step of incorporating into said tire and wheel assembly enclosing means for at least one ingredient of a lubricant composition for lubricating the interior surfaces of the tire, and locating a further ingredient or ingredients of the lubricant composition in the inflation chamber of the tire and wheel assembly without any enclosing means therefor, said enclosing means for the first ingredient being adapted to release said first ingredient into the inflation chamber defined by the tire and wheel upon substantial loss of inflation pressure or deflation of the tire to form the composition.

According to the invention also a pneumatic tire and wheel assembly comprises enclosing means for at least one ingredient of a lubricant composition for lubricating the interior surfaces of the tire, a further ingredient or ingredients of the lubricant composition being carried on the interior surface of the inflation chamber of the tire and wheel assembly, said enclosing means being adapted to release said ingredient into the inflation chamber defined by the tire and wheel upon substantial loss of inflation pressure or deflation of the tire to form said composition.

One ingredient of the lubricant composition may be loose in the interior of the inflation chamber or may be applied to the interior of the tire, or to the wheel rim, or to both. Preferably, however, it is applied to the interior surface of the tire in a position in which it will rapidly come into contact with the other ingredient of the lubricant composition when that is released from the enclosing means.

The lubricant composition may suitably be based on a liquid lubricant e.g. as described in the assignee's U.S. Pat. No. 3,739,829 issued June 19, 1973, but preferably contains one or more solid or highly viscous constituents which are suitable to be carried on the interior surface of the assembly e.g. on the interior surface of the tire.

The lubricant composition is used to lubricate the interior surfaces of the tire but may also be utilized to perform two other functions, namely to seal a puncture in the tire and to at least partially reinflate the tire.

A liquid lubricant may be selected from a wide range of classes of compounds which include lubricants for rubber to rubber interfaces, for example:

| | |
|---|---|
| Water | |
| Animal oils | |
| Vegetable oils | e.g. castor oil, boiled linseed oils |
| Alcohols, monohydric | e.g. n-octanol |
| dihydric (diols, glycols) | e.g. ethylene glycol |
| trihydric (triols) | e.g. glycerol |
| polyhydric (polyols) | |
| Esters | e.g. methyl caprylate |
| Silanes | |
| Non-ionic surface active agents | |
| Cationic surface active agents | |
| Anionic surface active agents | |
| Poly(oxyalkylene) glycols of generalized formula $$RO-\left[CH_2-CH-O \atop R'\right]_x -R''$$ | e.g. poly(oxyethylene) glycols and poly(oxypropylene) glycols of various molecular weights and blends of these. |
| or poly(oxyalkylene) glycols containing copolymers of two or more different oxyalkylene components of generalized formula $$RO\left[CH_2-CH-O \atop R''\right]_m-\left[CH_2-CH-O \atop R''\right]_n-...R'''$$ In these generalized formulae R, R', R'' and R''' represent alkyl groups or H and m, n and x are integers. | e.g. blends of copolymers of various molecular weights containing ethylene oxide and propyleneoxide units, for instance Ucon 50-HB-2000 ex Union Carbide. |
| Glycol ethers | e.g. hexyl cellosolve ($C_6H_{13}OCH_2 CH_2OH$) butyl carbitol ($C_4H_9O(CH_2CH_2O)_2H$) methoxy triglycol ($CH_3O(CH_2CH_2O)_3H$) |
| Dibasic acid esters | |
| Chlorofluorocarbon polymers | |
| Silicones | (organo-silicon oxide polymers) |
| Silicate esters | |
| Fluoroesters | |
| Neopentyl polyol esters | |

| | |
|---|---|
| Polyphenyl ethers | |
| Ferrocene derivatives | |
| Tetra-substituted urea derivatives | |
| Heterocyclic derivatives | |
| Soaps | e.g. sodium stearate |
| Alkalis | e.g. sodium carbonate in aqueous solutions. |

Blends of two or more such materials may be used.

It is useful if the lubricant composition will help to seal a puncture in the tire simply to prevent loss of lubricant but when the lubricant composition contains a volatile component it is most desirable that the composition should be capable of sealing the puncture. Thus the lubricant composition may have incorporated therein a separate puncture-sealing or reducing material, for example, chopped cotton wool, asbestos or synthetic fibers, e.g. of 0.0001 inch diameter and about 0.1 inch long which acts to form a better barrier over a puncture and is carried into position by escaping inflationary air and/or lubricant. Such materials preferably have a range of lengths and diameters. They can seal better if used in conjunction with other solid materials such as graphite, mica, crumb rubber, polyethylene flakes, etc.

A convenient method of obtaining a lubricant composition which will at least partially reinflate the tire after the puncture has been sealed is to use a lubricant composition containing a volatile component. Thus the lubricant composition may, with advantage, contain a volatile liquid, which may or may not in itself act as a lubricant for the rubber but which has a boiling point sufficiently low to appreciably volatilize at the temperature generated by running of tire in a deflated or partly deflated condition. In this way the volatile liquid functions to partially re-inflate the tire and so reduce the high stresses generated in the sidewall and tire/wheel assembly generally, due to the deflated or substantially deflated condition.

Alternatively the lubricant composition may include two ingredients which react when brought together producing a gas to at least partially reinflate the tire.

When a lubricant composition which achieves partial reinflation is used heat build-up in the tire is lowered due to the reduced sidewall deflection the reduced contact pressure and hence reduced frictional forces between the interior tire surfaces. When a volatile liquid is used to achieve the reinflation the volatilizing of the volatile liquid also assists the dissipation of heat over the entire tire and rim surface. The volatile liquid may have a boiling point (or, if two or more volatile components are used, an initial boiling point) up to, for example, 150°C. but preferably not below, for example, 60°C, in order that the liquid may be readily handled and not volatilized appreciably during normal running of the tire.

The volatile liquid may itself be used to form the basis of the lubricant, e.g. an aqueous gel, although it is then particularly preferable to include in the lubricant composition some puncture-sealing material in order to at least partly seal a puncture occurring in the tire to minimize the rate at which lubricant and vapour is lost from the tire.

Preferably the lubricant composition containing a volatile liquid comprises also a high boiling point lubricant, e.g. glycerol, to ensure continued lubrication in the event of loss of the volatile component by evaporation.

A preferred volatile liquid is water, which has lubricating properties on rubber to rubber contacting surfaces. Preferably the water contains a further volatile liquid such as an alcohol, e.g. ethyl alcohol, to enhance the volatility (lower the initial boiling point) and also reduce the freezing point of the water (if this has not been adequately reduced by the high boiling component). Various components already mentioned such as cellulose derivatives e.g. carboxy methyl cellulose, hydroxy-ethyl cellulose; surface active agents — cationic, anionic and non-ionic; and soaps can be used to enhance the lubricity of the water.

In the case of liquid lubricants containing water as the volatile liquid viscosities at 20°C., at low shear, in the range 10,000 to 200,000 centistokes, and good lubricant properties can be achieved by the use of gelling agents such as those available under the Trade Names of Natrosol (ex Hercules Powder Company), and Carbopol (ex Goodrich Chemical Company). The viscosity of these gels reduces with increasing shear. Viscous liquid lubricants such as gelled lubricants have the added advantage that they assist in sealing small punctures at least against the usually low, e.g. 4 p.s.i., pressures produced by vapour pressure inflation.

Examples of liquid lubricants containing water as the volatile component are solutions of detergents e.g. "Teepol" in water, aqueous gels containing e.g. hydroxy-ethyl cellulose with or without a high boiling component such as glycerol, and mixtures of polyglycols, poly(oxyalkylene) glycols or glycerol with water.

The liquid components of the lubricant composition are preferably miscible with water so that leakage from a tire and wheel assembly onto a road surface can be washed away, e.g. by rain water although water insoluble components can be used if desired. It is also desirable that the lubricant composition should not freeze at temperatures above −20°C. so as to withstand cold weather and for extreme climates at temperatures above −50°C. The liquid lubricant may have a boiling point of at least 90°C. and preferably, in order to withstand high temperatures without severe loss through volatilization a liquid component of the lubricant has a boiling point above 140°C.

As well as being formulated to have a suitable viscosity for low rubber to rubber friction at the working temperature two other factors are preferably taken into account.

The lubricant composition advantageously has a viscosity which is as high as is practicable to minimize lubricant loss through a puncture and perhaps even assist in sealing a puncture. At the same time the composition should have a viscosity a low as practicable to enable it to flow readily into the portions of the tire interior requiring lubrication. The preferred viscosity range for the liquid lubricant in operation is 4 to 2,500 centistokes at the temperatures generated in the nip between contacting surfaces when the tire is run without any inflation pressure. This temperature is estimated to be in the range 50° to 130°C. In some formulations, however, the lubricant composition under prepuncture conditions may be, for example, a gel having a much higher viscosity but whose viscosity may be reduced by shear or by the addition of an ingredient which dilates the gel.

The lubricant composition preferably has no deleterious affect on the tire although, if desired, compositions which normally swell or otherwise affect rubber could be used by the use of a special resistant inner liner in the tire. In the latter case an ingredient which swelled rubber could act to assist in sealing a puncture in the tire, since the puncture hole would permit the swelling agent to pass through the liner and swell the rubber in the walls of the puncture.

Further additives may also be used in the lubricant composition, for example, a lubricant composition based on an aqueous gel may contain, for example a freeze point lowering agent such as ethylene glycol or glycerol and agents to increase the lubricating power such as molybdenum disulphide, dispersible graphite powder and/or wetting agent or detergent such as "Teepol".

If, for example, a detergent is used in a lubricant containing water a defoaming agent may also be used in the lubricant composition to control the extent of foaming, or if desired, prevent foaming.

A dispersant may be used when fibers or other insoluble solids are incorporated in the composition.

In addition to the puncture sealing and other additives previously mentioned the lubricant composition may contain other substances such as antioxidant, to reduce the rate of oxidative attack on the lubricant, bactericide, wetting agent and viscosity index improver to broaden the range of temperatures at which the composition has a satisfactory viscosity, and corrosion inhibitor to protect the wheel rim, which will generally be of metal, from corrosion.

In order to minimize the weight of lubricant composition required and any detrimental effects on the balance of the wheel/tire assembly the lubricant composition preferably has a relatively low specific gravity e.g. a specific gravity less than 1.4.

In this invention a part of the lubricant composition is to be held enclosed in an enclosing means in the tire and wheel assembly and the remainder of the composition placed in the inflation chamber of the assembly. This has the effect of keeping apart the ingredients of the lubricant composition until tire deflation takes place and the composition is required.

There are several advantages to be gained by the invention:

When using a lubricant composition of the aqueous gel type, if the complete composition is enclosed ready mixed the viscosity of the composition may reduce with storage or the viscosity may be too high for easy flowability and thus delay its exit from the enclosing means when released.

When a volatile component such as water is present in a lubricant composition loss by evaporation and diffusion through the tire is a possible difficulty if this component is not enclosed. However, if the whole composition is enclosed there may be no lubricant in the tire in the first few moments after a tire bursts before the lubricant has had time to be dispersed in the tire. This difficulty can be avoided by enclosing the volatile part of the lubricant composition and placing the remainder of the composition in, or coating it on, the tire interior.

In a case where a lubricant composition is required to produce a vapour or gas to at least partially inflate the tire the two ingredients kept separate may be two substances which chemically react when brought together to produce a gas e.g. a solution of acid in the enclosing means and calcium carbonate on the interior surface. In this case the solution of acid may be enclosed separately from, or in admixture with other ingredients of a lubricant composition e.g. water, ethylene glycol. The gas generated in this case by mixing the ingredients would be carbon dioxide.

When the lubricant composition is to be an aqueous gel the ingredients of the part of the lubricant composition which is enclosed may for example be water, containing various additives dissolved or dispersed therein such as fine asbestos fibres, detergent, defoaming agent etc. A solid gelling agent such as hydroxyethyl cellulose, hydroxypropyl cellulose, sodium carboxymethyl cellulose, carboxymethyl hydroxymethyl cellulose and carboxyvinyl polymers, possibly with other soluble and insoluble ingredients, may simply be placed in the tire or may be applied to the interior of the tire or the surface of the wheel rim as a coating, with or without a suitable binder or carrier. A particularly suitable binder or carrier would be a highly viscous semi-solid lubricant for the rubber/rubber interfaces. The liquid water based ingredient is rapidly dispersed when released but on contact with the gelling agent coating becomes a composition of much higher viscosity which will help in sealing the puncture.

Where the lubricant composition comprises a poly(oxyalkylene) glycol or modified poly(oxyalkylene) glycol, as a non-volatile component, with or without one or more of the following: (i) alcohols, (ii) water, (iii) glycol ethers, (iv) silicones, (v) silicate esters, (vi) tetra-alkyl silanes, (vii) soaps, viii) alkalis, (ix) polymers containing functional groups, it is particularly useful to convert at least the non-volatile ingredients of the lubricant composition into a gel. The gel is thus coated on the interior of the tire while the volatile ingredients are enclosed in a suitable container to be released only when the tire deflates thereby ensuring that the volatile components are not lost or reduced by evaporation. It is convenient in this case to arrange that the volatile ingredients contain a dilatant for the gel so that the gel is broken down when the volatile ingredients are released into the tire.

For most purposes the gel is preferably of sufficiently high viscosity not to flow around inside the tire while the tire is stationary nor when the tire is rotating, otherwise unbalance may be caused. In some circumstances, however, this may not be necessary e.g. in large off-the-road tyres where unbalance is not a problem, or where the amount of gel is very small. The gel must also be thermally stable at the normal running temperatures generated in the tire and at temperatures to which the tire is liable to be subjected e.g. over the range −20°C. to 90°C. The vapour pressure of the gel at 140°C. is preferably less than 50 mm of Hg.

The gel may be made by any suitable methods, for instance:

A. The addition of finely divided fillers, especially those with colloidal dimensions (200–500 A) in the form of spheres, rods or platelets to the lubricant fluid. This causes a three-dimensional structure to be formed. The three dimensional network may be mechanically strengthened by the addition of additives (e.g. sodium carbonate, or hexamethylene diamine).

The inert filler may be organic or inorganic in kind and includes:

i. Silicates in the form of platelets (clays, micas, etc.) rods, fibres (asbestos), or spherical particles (silica - aerosil).

ii. Polar organic polymers such as cellulose and other polyamides (e.g. nylon) especially those polymers which may be obtained in a finely divided form.

iii. Crystalline polymers which will dissolve and crystallize and form a three-dimensional network.

In preparing these gels intensive mixing techniques may be used e.g. ultra-high speed mixers, paints mills, ultrasonic stirring.

B. The gelled compositions may be prepared from high and low molecular weight polymers containing functional groups such as hydroxyl tipped polyether or polyesters, or carboxyl or amine tipped polymers which may include the lubricant.

C. Cross-linking with isocyanates under controlled conditions or by the use of metal oxides (e.g. MgO, ZnO, $Al_2O_3$).

As an alternative to process B the gel may be formed in situ by using the lubricant liquid as a solvent and adding monomers (e.g. acrylates) and polymerizing to give a gel which imbibes the lubricant.

The viscosity of the gel is preferably high e.g. in a range up to 5,000,000 centipoises at room temperature. Where the gel is shear-sensitive the viscosity is that measured at a shear rate of $0.3 \, S^{-1}$.

On addition of the volatile ingredients of the lubricant composition to the gel the gel is preferably broken down to a viscosity in the range 4 to 20,000 centipoises at 38°C. The breakdown of the gel is best achieved by inclusion with the volatile ingredients of a chemical reagent whose precise function depends on the type of cross-linkages present in the gel, these being usually either hydrogen-bonds or ionic bonds, or lattice forces or a combination of each.

For the breakdown of hydrogen-bonded gels suitable reagents may be selected from water, alcohols, acids and alkalies, aprotic solvents (e.g. dimethyl formamide, dimethyl sulphoxide, tetra-hydrofuran) or inorganic salts, of Group I, II, III and IV e.g. LiCl, $CuSO_4$, $Al(NO_3)_3$, and $Ce(SO_4)_2$. Mixtures of these reagents may be used.

For the breakdown of ionic bonds suitable reagents are solvents of low dielectric constant, and in the case of the gels prepared using metal oxides, proton donors (e.g. acids etc.) are necessary.

In the case of gels involving weak chemical bonds (e.g. allophonates in polyurethane systems) phenols may be used as the breakdown reagent.

The amount of reagent used to cause breakdown of the gel, where a liquid reagent is used, may, for example, be in the range 1% to 65% by volume of the volume of gelled lubricant, although particularly when water and alcohol or solutions in these solvents are being used larger amounts of breakdown reagent may be used if desired.

Breakdown reagents may themselves be volatile ingredients of the lubricant composition, or give rise to gaseous products, or may be mixed with or dissolved in the volatile ingredients, which will at least partly reinflate a punctured tire.

A number of suitable enclosing means for use in this invention are described in U.S. patent application Ser. No. 150,627 filed June 7, 1971 e.g. rupturable sachets attached to the interior of the tire, lubricant containers on the wheel rim or built into the wheel rim, all of which may be used to enclose one ingredient to keep the two ingredients apart until required to be brought together. It will be appreciated that the enclosing means may be inside the inflation chamber of the tire and wheel assembly or may be carried on the wheel and connected to the inflation chamber by a suitable passage.

When the wheel rim being used is a split rim a particularly suitable arrangement consists of a plurality of containers mounted on a supporting band e.g. a metal band, which may simply be slid onto the rim when the two parts of the rim are separated.

The pneumatic tire is preferably a radial ply pneumatic tire of relatively low aspect ratio e.g. 50 per cent to 75 per cent and to ensure that, at least in a straight-ahead static position, the load from the rim flanges is carried by the tread of the tire, the tire preferably has a tread wider than the distance between the rim flanges when mounted on the rim in the tire/wheel assembly.

Preferably the tire is of the type described in U.S. patent application Ser. No. 290,814 filed Sept. 21, 1972 in which the stiffness of the tread and sidewall structure with the width of the tread is such that when in use with the tire deflated or substantially deflated and subject to a substantial lateral force one of the said sidewalls will be placed under tension in the region of the contact patch to restrain the tread from lateral movement while the other sidewall will be disposed in a folded state in the said region so as to be capable of acting as a buffer between a flange on a wheel rim on which the tyre is mounted and a road surface.

It will be appreciated that the present invention is concerned with a tire and wheel assembly which is to be capable of being used with the tire in a deflated or substantially under-inflated condition. This is not possible with a conventional tire/well-base rim assembly since when the tire becomes deflated the tire beads can move from their seats and, because of the well in the rim, lose contact with the rim so that controlled movement of the tire by the rim is lost.

In the use of the present invention steps therefore must be taken to ensure that the tire is not dislodged in this way. Thus either a rim without a well should be used, e.g. a split rim or a rim in which the well has been closed up by axial compression after the tire mounting has been facilitated, or restraining means should be provided to prevent either bead falling into a well. Many such restraining means have been previously proposed e.g. a bead spacer, spacer units, movable studs or projections on the wheel rim. A preferred means of restraining the laterally outer tire bead on a split or an axially compressed rim is to provide the tire bead with an extended toe portion in the form of an annulus which is inwardly directed and rests in the notch in the rim as described in the assignee's U.S. patent application Ser. No. 276,449 filed July 31, 1972. The annulus is compressed into the notch upon the tilting of the bead under the influence of lateral forces and the bead is thus restrained from axial movement.

This invention will now be described in more detail in the following examples in which reference is made to the accompanying drawings of which:

EXAMPLE I

Figure 1:
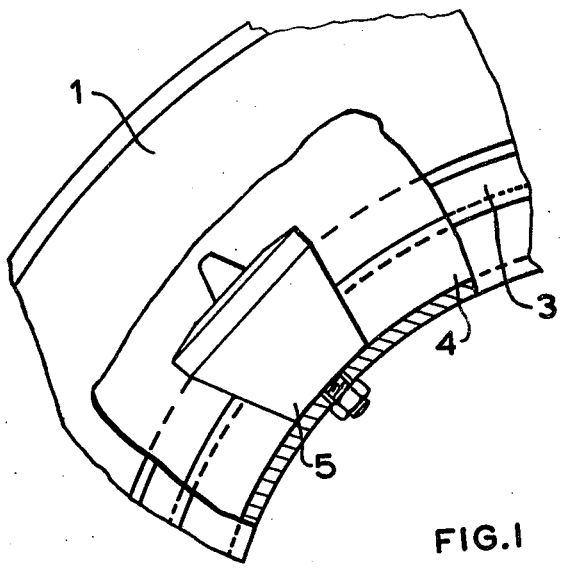
FIG. 1 is a side view of a portion of a tire and wheel assembly from which a part of the tire and of the wheel rim has been cut away to reveal the interior.
Figure 2:
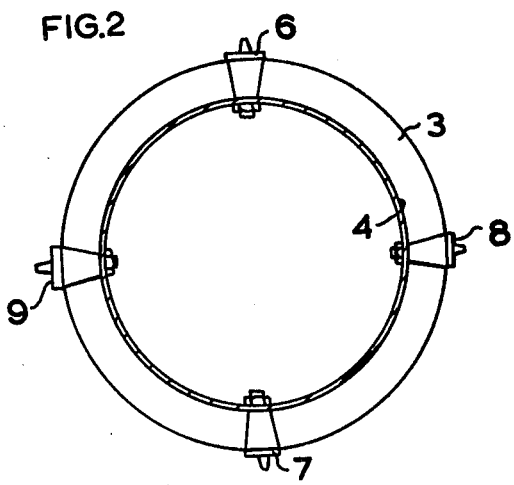
FIG. 2 is a sectional side view of the wheel rim of FIG. 1 with containers attached.

As illustrated in FIGS. 1 and 2 the pneumatic tire and wheel assembly consists of a radial ply tire 1 and wheel having a well base rim 3. Within the well 4 of the rim are located four containers 5 which contain one component A of a lubricant composition. The remainder B of the lubricant composition is carried in the interior of the tire and wheel assembly as loose solid particles.

Parts A and B of the lubricating composition each contain more than one ingredient and their compositions are given below in Tables I and II, the amounts being suitable for a tire of size 185-60-13.

TABLE I

| | |
|---|---|
| Teepol S (anionic surface active agent) ex. Shell Chemical Ltd.) | 15 ml. |
| Water | 285 ml. |
| 2% Belloid T.D. dispersent (80% sodium dinaphthylmethane disulphonate ex. Geigy) | 15 ml. |
| Defoamer CVP (ex. Cray Valley Products) | 3 ml. |

TABLE II

| | |
|---|---|
| Asbestos fibers | 6 g. |
| Natrosol 250 (hydroxymethyl cellulose ex. Hercules Powder Co.) | 3 g. |

The containers 5 are of the type in which each consist of a rigid shell of plastics material and are secured in position in a hole in the wheel rim by means of a screwed hollow metal spigot positioned centrally in the base of the container shell. The radially outer portion of the shell is arranged to project beyond the well of the rim and is provided with a valve plunger projecting beyond the shell. When deflation of the tire occurs the plunger is depressed once per revolution by the interior of the crown of the tire. This plunger operates a valve within the shell which is arranged to release reagent from the shell only when the plunger is depressed.

This arrangement has the advantage that all the contents cannot be released from the shell by a single impact on the tire.

The two-part lubricant system described in the Example above avoids the difficulty that asbestos fibers, being a solid and a puncture blocking medium, may be difficult to release rapidly from an enclosing means.

Also, the Natrosol thickener is kept separate from the water so that the component A on the enclosing means is a low viscosity liquid which can be released rapidly from the enclosing means.

EXAMPLE II a. Preparation of gelled compositions containing a poly(oxyalkylene) glycol as a non-volatile lubricant component.

Process A

A variety of gelled compositions were obtained by dispersing finely divided fillers on a 3 roll paint mill into low molecular weight poly(oxyalkylene) glycol polymers.

| Typical Recipe | |
|---|---|
| Poly(oxyalkylene) glycol (Ucon 50-HB 5100) | 25 g. |
| Silica (Aerosil 300) | 1.25 g. |

This mixture was passed four times through a 3 roll mill and gelled on standing at room temperature.

Mechanically stronger gels were formed by use of metal salt additives.

| | |
|---|---|
| Poly(oxyalkylene) glycol (Ucon 50-HB 5100) | 25 g. |
| Silica (Aerosil 300) | 1.25 g. |
| Sodium Carbonate | 0.25 g. |

Again the mixture was passed four times through a 3 roll mill and this time it gelled on the mill.

A lubricant containing further ingredients was gelled in a like manner.

| Recipe | |
|---|---|
| Poly(oxyalkylene) glycol (Ucon 50-HB 5100) | 25 g. |
| Water | 5 g. |
| Methylated Spirits | 2.5 g. |
| (5% by volume of methano, 95% volume G4 OP Ethyl Alcohol) | |
| Silica (Aerosil 300) | 1.63 g. |
| $Na_2CO_3$ | 0.33 g |

The following table contains examples of systems which have produced reasonably strong gels and which have undergone successful chemical breakdown. In all cases the poly(oxyalkylene) glycol UCON 50 HB 2000 was used with 5% by weight of Silica filler and a solid base (see below) and the final gel, prior to breakdown, contained 11% (by weight) of water:

| Solid base added with the silica filler | Breakdown agent (in aqueous or aqueous ethanolic solution) |
|---|---|
| $Na_2CO_3$ - 1.0g/100q of final gel | hydrochloric acid 10cc/ 100cc of final solution |
| " - 1.0 - ditto - | phosphoric acid 7.5cc/ 100cc of final solution |
| " - 0.5 - ditto | Maleic acid 10 g/100 cc of final solution |
| " - 0.25 - ditto | Aluminium sulphate 10g/ 100 of final solution |
| $Na_2CO_3$/$NaHCO_3$ - 0.25/0.25 - 1.0g/ 100 of final gel | Maleic acid 10g/100cc of final solution |
| $NaHCO_3$ - 1.0 ditto | Aluminium sulphate 10g/ 100cc of final solution |
| Borax - 1.0 ditto | Maleic acid 10g/100cc of final solution |

Process B

A liquid poly(oxyalkylene) glycol (50g UCON 50 HB 5100) containing hydroxyl end groups was treated with 2:4, 2:6 toluene di-isocyanate (TDI) using Cobalt naphthenate as catalyst and the mixture heated in an oven for 30 minutes at 115°C. Various types of gels were obtained as the concentration of TDI was changed.

| TDI | Description |
| --- | --- |
| 3.3 g | Stiff gel |
| 2.2 g | Medium gel |
| 1.6 g | Soft gel |

The gels made by Process A or Process B above may be coated on the interior of a tire and may be broken down by the addition of a suitable reagent, e.g. for those gels made by Process A, hydrochloric acid in an amount of 50% by volume of the volume of gel, which will also serve as, or may be incorporated in, the volatile ingredients of the lubricant composition which are contained until needed by the enclosing means.

b. Use of a gelled lubricant in the tire and wheel assemblies illustrated in FIGS. 3 to 7.

The following gel was produced using the method described in Example II - Process A

| Ucon 50-HB-2000 | 90 gms |
| --- | --- |
| Sodium carbonate | 1.0 gms |
| Aerosil 300 | 5.0 gms |
| Water | 4.0 gms |

180 gms of this gel was uniformly applied to the inside crown of a 185/60-13 radial ply tire 20 as a coating 21 and 18 gms of rubber crumb ground to pass through a 10 mesh sieve (width of aperture 1.7 mm) was sprinkled onto the surface of the gel so that it adhered to it.

Figure 4:
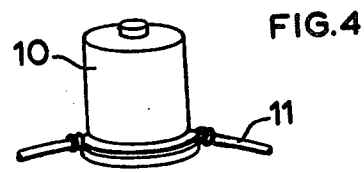
FIG. 4 is a perspective view of one of the containers of FIG. 3.
Figure 3:
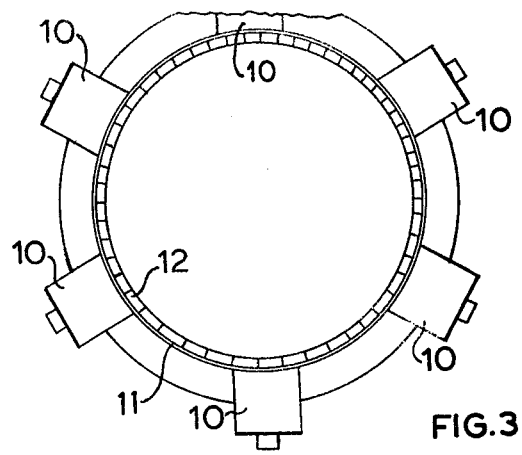
FIG. 3 is a similar view to FIG. 2 but showing a split rim on which a wire band carrying a plurality of containers is mounted.
Figure 5:
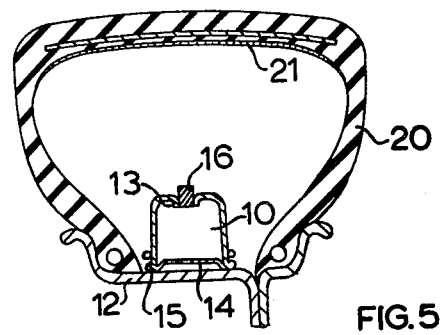
FIG. 5 is a cross-sectional view of a tire and wheel assembly containing the band and containers of FIG. 3.

The tire was then fitted to a split rim 12, (as shown in FIG. 5) together with an assembly of six metal containers 10, on a wire band 11, as shown in FIGS. 3 and 4. Each of the six containers was filled with 19 cc of the following mixture:

| Water | 50 mls |
| --- | --- |
| Teepol solution | .8 mls |
| Methylated Spirits | 31 mls |
| Ucon 50-HB-2000 | 30 mls |
| Maleic acid | 10 gms |

In FIG. 5 one such container is shown in section. The container is formed by pressing from an aluminium alloy in the conventional manner, the diameter was approximately 30 mm and the height approximately 34 mm. An 8 mm diameter hole was pierced in the blind end of the container and the edge of the hole formed into a lip 13. The open end was closed by a conventional end 14, seamed 15, to the container. After filling the container through the 8 mm hole it was sealed with a polythene plug 16, which was standing proud of the container by approximately 3 mm.

Figure 6:
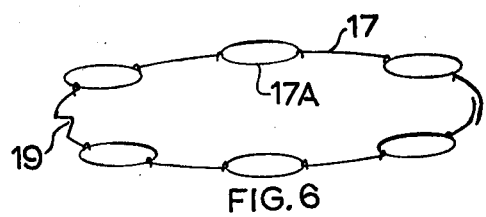
FIG. 6 is a perspective view of the wire band shown in FIG. 3.
Figure 7:
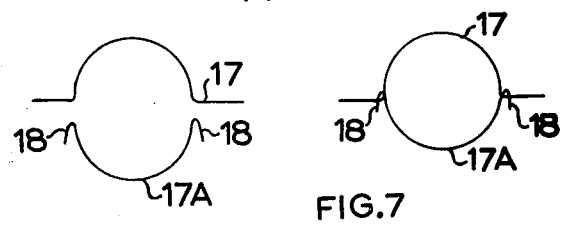
FIG. 7 is a pair of diagrams illustrating the detail construction of the wire band.

The wire band is shown in detail in FIG. 6. In essence it was an endless band with equally spaced wire loops through which the containers could be pushed and retained by the bottom seam. The method used to fabricate the wire band is shown in FIG. 7 where one half of the loop was formed in the wire 17, and the other half in a separate piece 17a. The ends 18 of the piece 17a were bent over so that they could be hooked over the wire 17, to form a closed loop. To accommodate manufacturing tolerances in both the rim and the band, a small triangular crimp 19, with approximately 10 mm sides was formed in the wire at one point to act as a spring and allow a small expansion of the band. Thus, when the band and containers were fitted to the rim, the band fitted tightly around the rim holding the containers tight in place against the rim as shown in FIG. 5.

An alternative form of wire band which may conveniently be used (not illustrated) is a loop made up of a pair of wires closely twisted together, loops being left between the pair of wires at spaced intervals. The finished band is thus similar to that shown in FIG. 6 except that the portions between the loops are made of two wires twisted together instead of a single wire.

The tire and wheel was fitted to a car the aspect ratio of the tire in the assembly being 65% the tire tread width 152 mm and the rim width between flanges 90 mm. The tire was punctured in the crown, and on driving the car on the punctured and flat tire, the inside crown of the tyre pushed the plugs into the containers and released the fluid into the tire enabling it to mix with the gel. The puncture sealed and as the tire continued to be run in the deflated state the water and alcohols vaporized and reinflated the tire to a pressure of 5 lbs./sq.in. When the tire was demounted from the rim it was found that the previously gelled Ucon was fully mobile and had performed its dual task of firstly lubricating the inner surfaces of the tire when running deflated and secondly carrying the rubber crumb around the tire to search out and seal the puncture.

Having now described our invention, what we claim is:

1. A pneumatic tire and rim assembly capable of being run in a deflated condition comprising:
    a. a pneumatic tire having an interior surface and mounted upon a rim, to define an inflation chamber, said assembly having means to prevent the tire beads from becoming dislodged from the rim when operated in a deflated condition;
    b. means at least for lubricating contacting interior surfaces of the tire when operated in a deflated condition comprising a composition having a plurality of ingredients at least one of said ingredients being a lubricating material;
    c. said composition being carried in the assembly in at least two parts, one part comprising a gelled lubricating material, the other part comprising a break down reagent for said gel;
    d. enclosing means for enclosing the part comprising a break down reagent for the gel separately from the gel;
    e. the gel being carried on the interior surface of the tire;
    f. said enclosing means being adapted to release the part of the composition comprising break down reagent into said inflation chamber upon deflation or substantial loss of inflation pressure to permit said break down reagent to dilate the gel and form a mobile lubricating composition.

2. A pneumatic tire and wheel assembly according to claim 1 in which the part of the composition carried on the interior surface of the assembly includes ingredients selected from the group consisting of a gelled poly(oxyalkylene) glycol and modified poly (oxyalkylene) glycol.

3. A pneumatic tire and wheel assembly according to claim 2 in which part of the composition in said enclosing means includes the means to at least partially reinflate the tire comprising a volatile liquid which has a boiling point sufficiently low to appreciably volatilize at the temperature generated by running of the tire in a deflated condition, and comprises a break down reagent for the gel so that the gel is broken when the volatile ingredients are released from the enclosing means.

4. A pneumatic tire and wheel assembly according to claim 1 in which said gelled lubricating material is selected from the group consisting of a gelled poly(oxyalkylene) glycol and a modified poly (oxyalkylene) glycol.

5. A pneumatic tire and wheel assembly according to claim 4 in which the gel contains, as a gelling agent, a finely divided filler.

6. A pneumatic tire and wheel assembly according to claim 4 in which the gel is one prepared from high and low molecular weight polymers containing functional groups.

7. A pneumatic tire and wheel assembly according to claim 4 in which the gel is one prepared by cross-linking with isocyanates under controlled conditions.

8. A pneumatic tire and wheel assembly according to claim 4 in which the gel is one prepared by cross-linking by the use of metal oxides.

9. A pneumatic tire and wheel assembly according to claim 5 in which the filler is a silicate filler.

10. A pneumatic tire and wheel assembly according to claim 1 in which the part of the lubricant composition enclosed in the enclosing means comprises at least one volatile ingredients selected from the group consisting of water, alcohols, dilute acids and alkalis, aprotic solvents and aqueous solutions of inorganic salts of group I, II, III, and IV.

11. A pneumatic tire and wheel assembly according to claim 10 in which the enclosed ingredients comprise water, an alcohol and a weak acid.

12. A pneumatic tire and wheel assembly according to claim 1 in which the gel is of sufficiently high viscosity not to flow around inside the tire while the tire is stationary or rotating.

13. A pneumatic tire and wheel assembly according to claim 1 in which the wheel rim is a split rim having no well into which the tire bead can fall and the enclosing means comprises a plurality of containers mounted on a supporting band extending around the rim.

14. A pneumatic tire and wheel assembly according to claim 1 in which the pneumatic tire is a radial ply pneumatic tire having an aspect ration in the range 50% to 75%.

15. A pneumatic tire and wheel assembly according to claim 1 in which the pneumatic tire has a tread which is wider than the width between the flanges of the rim on which the tire is mounted.

* * * * *